United States Patent [19]
Yamano et al.

[11] Patent Number: 5,053,904
[45] Date of Patent: Oct. 1, 1991

[54] HARD DISK DRIVING DEVICE HAVING A PLURALITY OF HEAD SLIDERS WITH EQUALIZED FLOTATION HEIGHT

[75] Inventors: Takashi Yamano, Itau; Yasushi Katanuma, Sapporo; Hideyasu Takemura, Furukawa; Michiko Kumagai, Furukawa; Hiroshi Yoshida, Furukawa; Toru Kaneko, Sendai, all of Japan

[73] Assignee: Alps Electric Co., Ltd., Tokyo, Japan

[21] Appl. No.: 504,143

[22] Filed: Apr. 3, 1990

[30] Foreign Application Priority Data

Apr. 3, 1989 [JP] Japan ................................. 1-81512

[51] Int. Cl.5 .......................... G11B 5/60; G11B 5/48
[52] U.S. Cl. ..................................... 360/103; 360/104
[58] Field of Search ............... 360/103, 102, 104, 109

[56] References Cited

U.S. PATENT DOCUMENTS

| | | | |
|---|---|---|---|
| 4,074,330 | 2/1978 | Norton et al. | 360/102 |
| 4,214,287 | 7/1980 | Stromsta et al. | 360/103 |
| 4,636,894 | 1/1987 | Mo | 360/103 |
| 4,853,811 | 8/1989 | Brooks et al. | 360/103 |

Primary Examiner—A. J. Heinz
Assistant Examiner—Jefferson Evans
Attorney, Agent, or Firm—Guy W. Shoup; B. Noël Kivlin

[57] ABSTRACT

A hard disk driving device in which a plurality of hard disks each formed with a magnetic recording layer are secured to the same rotational shaft in a predetermined spaced relation, and a magnetic head mounted on a floating (flying) type head slider is disposed on each surface, characterized in that an area of a portion concerned with flotation of a head slider provided on a head slider assembly sandwiched between adjacent hard disks is made to be smaller than an area of a portion concerned with flotation of a head slider provided on a head slider assembly sandwiched between adjacent hard disks.

3 Claims, 4 Drawing Sheets

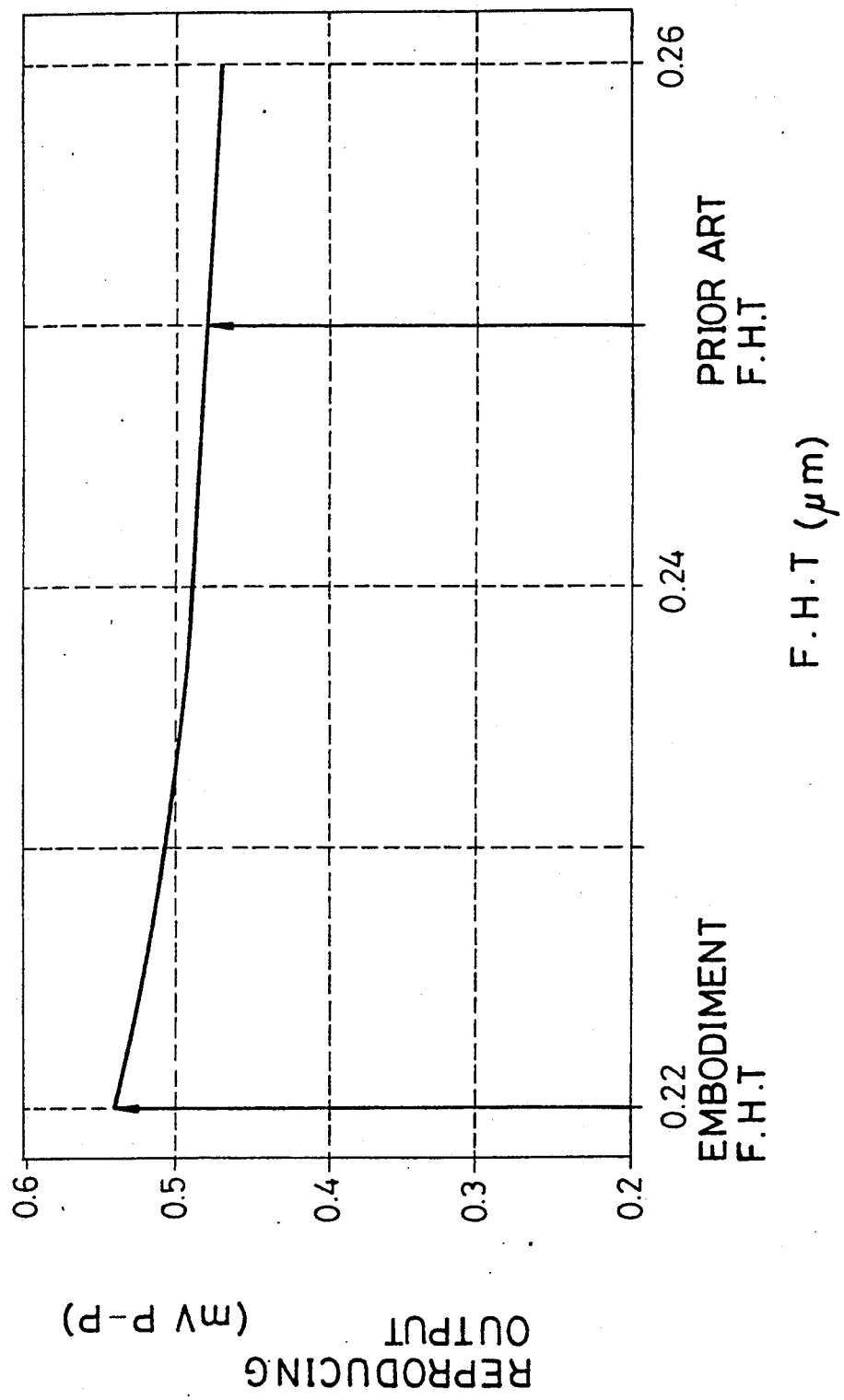

HARD DISK DRIVING DEVICE HAVING A PLURALITY OF HEAD SLIDERS WITH EQUALIZED FLOTATION HEIGHT

BACKGROUND OF THE INVENTION

1. Field of the Invention

This invention relates to a hard disk driving device in having a plurality of hard disks mounted in a predetermined spaced relation wherein a magnetic recording layer is formed on the surface of a hard disk, and a floating type head slider disposed on the surface of each of the hard disks to record and/or reproduce information.

2. Description of Prior Art

Various types of disk driving devices have been known in which an information recording medium, for example, a magnetic recording medium (hereinafter referred to as a magnetic disk) in the form of a disk is rotated and driven to record and/or reproduce information. Particularly, for devices which are small and require storage of a large amount of information, a disk driving device called a hard disk driving device (hereinafter referred to as an HDD device) has been often employed. In this HDD device, a magnetic disk wherein a magnetic recording layer is formed on the surface of a hard disk is rotated at a high speed, and a magnetic head supported on a slider is floated from the surface of the magnetic disk to effect recording and reproducing.

An example of the HDD device is shown in FIG. 3, which is an exploded perspective view of a conventional HDD device.

As shown in FIG. 3, the HDD device of this kind is fundamentally composed of two hard disks 1a and 1b (a hard disk being generally indicated at 1), a DD (direct drive) motor for rotating and driving the hard disk 1, a swing arm 8, a head slider 21 supported on a head base 10 mounted on the swing arm 8 so as oppose to a recording surface of the hard disk 1 through a cantilever supporting spring 9 also called a flexure, a magnetic head 2 integrally provided on the head slider 21, and a stepping motor 11 for swinging the swing arm 8 to transport the magnetic head in a radial direction of the hard disk 1.

The swing arm 8 is mounted through a bolt 13 on a swinging shaft stood upright on a base plate 4, the swing arm being swingable about the bolt 13. A steel belt 14 is extended on the end opposite the swinging shaft of the swing arm 8, the steel belt 14 being wound on a pulley 11a fitted in a drive shaft of the stepping motor 11 to move the magnetic head 2 in a radial direction of the hard disk according to an inching motion of the stepping motor 11 so that the desired track position may be selected. In this case, the swing arm 8, steel belt 14, pulley 11a and stepping motor 11 constitute a magnetic head transporting mechanism 15. In the main body of the thus constructed HDD device, for example, a cover 19 is mounted on the base plate 4 with seal means 18 comprising a spacer portion 16 and an elastic packing 17 sandwiched therebetween, and fastened by a bolt and closed.

A magnetic recording device such as the HDD device, a floppy disk drive device, etc. of this kind has been miniaturized because it is incorporated on a portable type personal computer. The HDD device of height 1 inch, i.e., 25.4 mm, has been demanded in the market. In order to obtain such thin HDD device, it is necessary to remove useless components so as to minimize the dimension of height of a spindle motor not shown and the stepping motor 11 and reduce the spacing between the hard disks 1a and 1b as narrow as possible to make small a space occupied by the hard disk 1 as a laminate.

FIG. 6 is an explanatory view showing the relationship between the hard disks 1a and 1b and the magnetic head 2 adjacent to each other in the prior art. The magnetic head 2 is mounted on the end of a supporting spring 9 as shown in FIGS. 4 and 5 through a head slider 21, and the back side of the head slider 21 (on the side in which a counter gap of the magnetic head 2 is formed) is opposed in which state a counter head slider mounting side of the supporting spring 9 is superposed, which superposed portion is locked by means such as a rivet 26 to the head base 10. Reference numeral 27 shown in FIG. 4 denotes a lead wire derived from a coil of the magnetic head 2.

In such a configuration, the slider 21 will have a predetermined floating amount, and a lift produced in the head slider 21 by rotation of the hard disk 1 and an elastic force of the supporting spring 9 have to be balanced, and therefore, it is necessary to bend the supporting spring 9 in the vicinity 9a of the fixing portion to the head base 10 to secure the desired elastic modulus. However, when the supporting spring 9 is bent to obtain the desired elastic modulus, irregularities increases, and the head slider 21 is inclined from the mounting portion due to the aforesaid bending, and therefore, allowance in height by that portion should be anticipated. Accordingly, there is a limitation to reduce the spacing between the hard disks 1a and 1b. This limit value is $A=5.08$ mm at the minumum between the hard disks 1a and 1b having a diameter of 3.5 inches since, in the prior art, both edges 9b of the supporting spring 9 are bent on the side opposite to the side in which the gap is formed.

In view of the above, an edge 9b is not bent on the mounting side of the supporting spring 9 to the head base 1 but the supporting spring 9 is linearly formed as shown in FIG. 9, mounting surfaces 10a and 10b of the supporting spring 9 at the end of the head base 10 are formed parallel with the recording surfaces of the hard disks 1a and 1b and the supporting spring 9 is mounted by use of the rivet 26 or the like as previously described. Then, $B=4.0$ mm at the minimum. This has been realized by bending the both edges 9c of the supporting spring 9 toward the side in which gap is formed as shown in FIG. 7 and 8 and setting the mounting height of the head slider 21 and the supporting spring 9 to $C=1.8$ mm at the minimum. Unless the supporting spring 9 is bended as previously mentioned, the value can be reduced by 0.64 mm as compared with the minimum $D=2.54$ shown in FIG. 5. Two of such materials are used to provide a thin configuration of 1.08 mm.

However, when the HDD device is designed to be thin as described above, there occurs a phenomenon wherein a reproducing output of the magnetic head 2 provided in a portion sandwiched between two hard disks 1a and 1b is lowered by approximately 20% of a reproducing output of the magnetic head 2 provided in a portion not sandwiched therebetween. The reproducing output of the magnetic head 2 sandwiched between the hard disks 1a and 1b is lowered as described above because a flow velocity of air in an area between two hard disks 1a and 1b is higher than a flow velocity produced between a surface not sandwiched between the adjacent hard disks 1a and 1b; that is, an inner surface of the cover 19 and a hard disk surface opposed thereto and a flow velocity produced between the upper surface of the base plate 4 and the hard disk surface opposed thereto. Therefore, in the head slider 21 of a single standard, the floating amount increases at a location in which flow velocity is high than the other in which flow velocity is not high, and as a result, there occurs a phenomenon wherein the reproducing output decreases by a portion in which the floating amount is large.

Fundamental methods for enhancing the reproducing output against the lowering of the reproducing output include a method for lowering a floating amount of the magnetic head 2 and a method for increasing a thickness of the hard disk 1. Among them, the specific measure for lowering the floating amount includes a. reduction in effective area in connection with the floating of the head slider 21, b. strengthening of the elastic modulus of the supporting spring 9 and/or increase in load pressure applied to the magnetic head 2, namely, the head slider 21 caused by the lowering in mounting level of the supporting spring 9, c. enlargement of the width of track, and d. increase in turn number of a coil wound about the magnetic head 2.

Further, specific measures for increasing a thickness of the hard disk 1 include:

e. increase in thickness itself of a magnetic layer, and f. lowering of coercive force.

With respect to the lowering of coercive force, when the growth of crystal of a lower layer of the hard disk 1 is suppressed, even if the same magnetic body is adhered with the same thickness, the coercive force is lowered to make writing easy, thereby enhancing the reproducing output.

However, when the load pressure is increased as in the above (b), the coefficient of friction increases and the contact start and stop characteristics of the head slider 21 lowers. When the track width is increased as in the above (c), write/read characteristics caused by the leakage flux from the adjacent track. When the turn number increases as in the above (d), where the coil is wound at the maximum at present, even if the coil is wound more than that, inductance increases, deteriorating the resolving power characteristics. When the thickness itself of the magnetic layer increases as in the above (e), the resolving power lowers lowering the overwrite characteristic. When the coercive force lowers as in the above (f), the resolving power characteristic likewise deteriorates. The deterioration of the resolving power means that the deterioration of the wide area characteristic deteriorates.

This invention has been achieved in view of the substance in enhancing the reproducing output as described above. It is an object of this invention to provide a hard disk driving device which can increase a reproducing output without bringing forth the disadvantageous condition as described above and can positively realize a thin configuration.

SUMMARY OF THE INVENTION

The present invention provides a hard disk driving device having a plurality of hard disks mounted in a predetermined spaced relation wherein a magnetic recording layer is formed on the surface of a hard disk and a floating type head slider is disposed on the surface of each of the hard disks, characterized in that an area of a portion concerned with floatation of a head slider provided on a head slider assembly sandwiched between the adjacent hard disks is made to be smaller than an area of a portion concerned with floatation of a head slider provided on a head slider assembly not sandwiched between the hard disks. With this, the head slider provided on the portion sandwiched between the adjacent hard disks becomes smaller in lift than that of the head slider not sandwiched between the hard disks. If an area concerned with floatation is adequately selected, the amounts of floatation of the head slider can be equal with respect to each surface, the reproducing output can be unified, and the thinner device can be positively realized

BRIEF DESCRIPTION OF THE DRAWINGS

FIG. 2 is a view showing the relationship between F.H.T and a reproducing output of a magnetic head;

DETAILED DESCRIPTION OF THE PREFERRED EMBODIMENTS

An embodiment of this invention will be described hereinafter with reference to the drawings.

Figure 1:
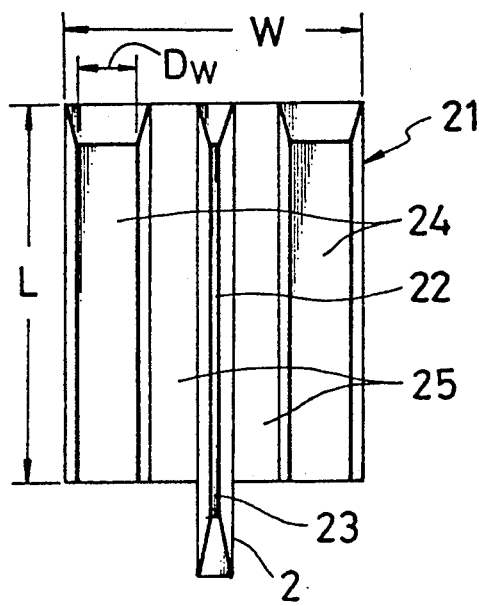
FIG. 1 is a front view as viewed from the side in which a gap is formed of a head slider according to an embodiment.
Figure 4:
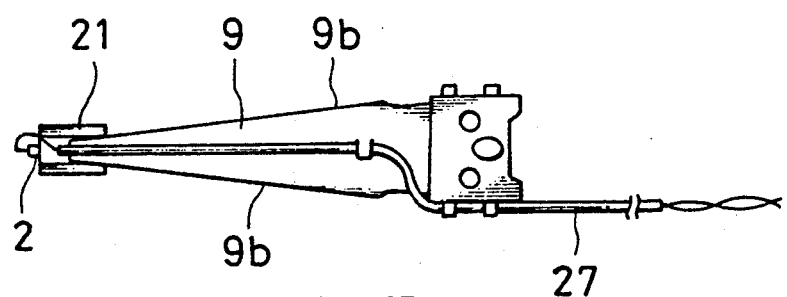
FIG. 4 is a plan view of a head slider and a supporting spring according to prior art.
Figure 5:
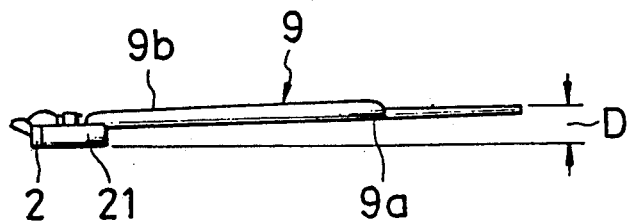
FIG. 5 is a front view of the same.
Figure 3:
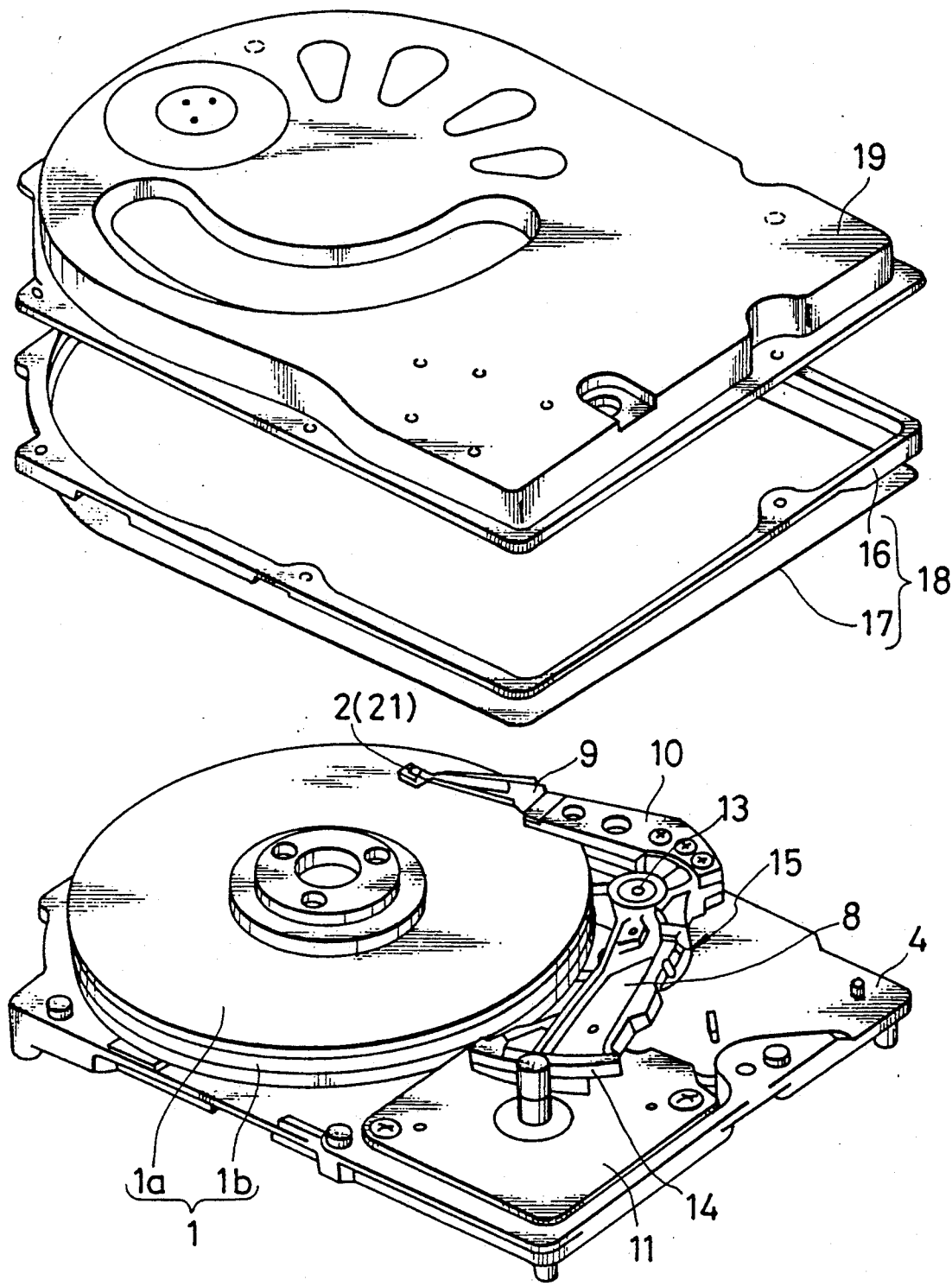
FIG. 3 is an exploded perspective view schematically showing a HDD device.
Figure 6:
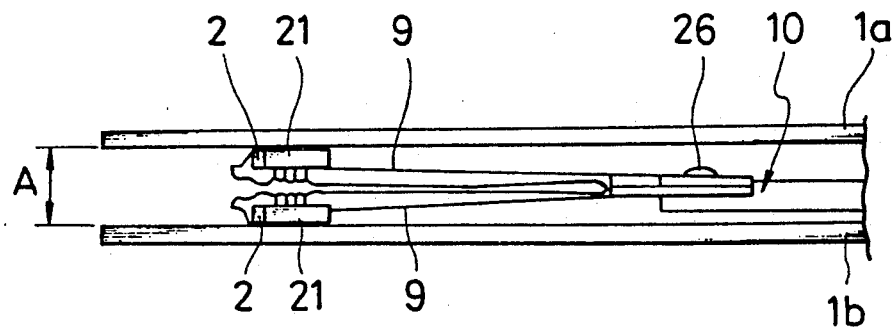
FIG. 6 is an explanatory view of the relative positional relation between a hard disk and a head slider.
Figure 7:
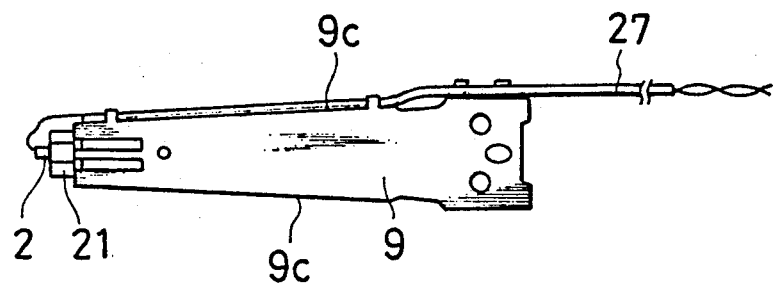
FIG. 7 is a plan view of a head slider and a supporting spring to which the present invention is applied.
Figure 8:
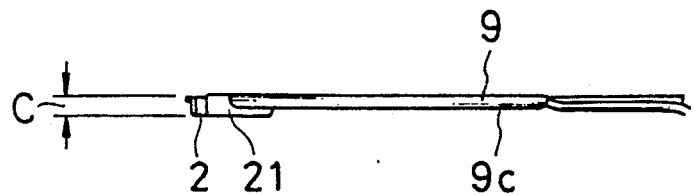
FIG. 8 is a front view of the same.
Figure 9:
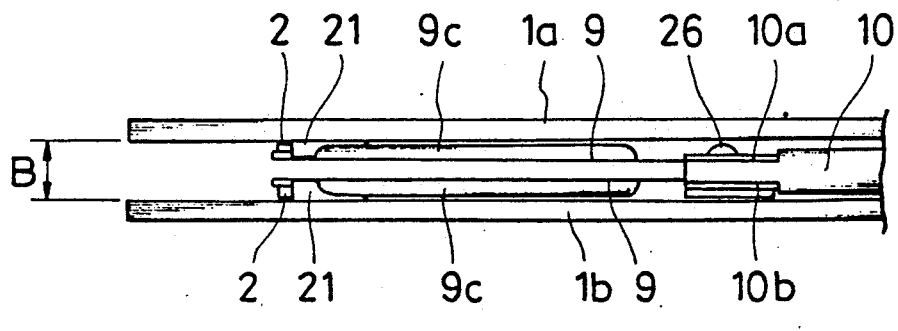
FIG. 9 is an explanatory view showing the relative positional relation between a hard disk and a head slider according to the embodiment thereof.

FIG. 1 is a front view as viewed from the side in which a gap is formed of a head slider according to the embodiment. In the following description, elements which are the same as or corresponding to those of the conventional example previously mentioned are indicated by the same reference numerals, and duplicate description will be omitted.

In FIG. 1, a head slider 21, which holds a magnetic head 2, is integrally formed of ceramics. The magnetic head 2 is arranged parallel with a tangential line of a rotational locus of the hard disk 1, and a gap 23 is formed below as viewed in the figure of a core 22 of the magnetic head 2. On the surface of the head slider 21 opposed to the hard disk 1, the core 22, a lift generating surface 24 and an air removing groove 25 are formed parallel with the core 22. A F.H.T (Flying Height) of the head slider 21 is a function of load pressure W (gf), peripheral speed V (m/s) of the hard disk 1 and one width Dw (mm) of the lift generating surface 24. The F.H.T is understood from experiences as follows:

$$F.H.T. \; \alpha \; W^{-\frac{1}{2}} * V^{\frac{1}{2}} * P_w^{3/2}$$

In this case, since the load pressure W and the peripheral speed V are constant, the width Dw is set so as to obtain the desired F.H.T. When the conventional width Dw (0.62 mm) is set to 0.58 mm for this time, as will be understood from FIG. 2 showing the relation between the F.H.T and reproducing output, the conventional F.H.T (0.25 μm) lowers to 0.22 μm, and the reproducing output (0.48 mVp-p) increases up to 0.54 mVp-p, which is approximately 10% up. Thereby, the reproducing output equal to that of the head slider 21 disposed at a position not sandwiched between the hard disks 1 was obtained. When the width Dw is varied, the gap between the adjacent hard disks 1a and 1b is set to 4.0 mm which is the minimum dimension at the present time as mentioned above, it is possible to positively suppress the unevenness of the reproducing output between the magnetic heads 2 to completely realize a thin HDD device.

In the above-described embodiment, the hard disk 1 having a diameter of 3.5 inches is rotated at 2640 rpm to effect recording and reproduction, and external dimensions of the head slider 21 is longitudinal length L=4.1 mm, and width W=3.2 mm. The dimension of the width Dw is suitably selected according to the diameter and peripheral speed of the hard disk 1. It is noted that the present invention is not at all limited by the aforesaid dimensions.

According to this invention wherein an area of a portion concerned with floatation of a head slider provided on a head slider assembly sandwiched between the adjacent hard disks is made smaller than an area of a portion concerned with floatation of a head slider provided in a head slider assembly not sandwiched between the hard disks as mentioned above, the reproducing output can be increased, merely by controlling a flying height of the head slider, without deteriorating the contact start and stop characteristic, cross talk characteristic and resolving power characteristic, thereby positively realizing a thinner device.

What is claimed is:

1. A hard disk driving device having at least two hard disks mounted in a predetermined spaced relation wherein a magnetic recording layer is formed on at least a first of each of said hard disks, and a pair of floating type head sliders opposing said first surface and a second surface of one of the hard disks such that one of said pair of head sliders is positioned inside an space between two of said hard disks and such that the other of said pair of head sliders is not positioned inside the space between two of said hard disks, characterized in that the head slider positioned inside the space between two of said hard disks has an air bearing surface which is smaller than the air bearing surface of the head slider not positioned inside the space between two of said hard disks, whereby each of said pair of head sliders have substantially equal flying heights.

2. The device of claim 1, wherein each of said pair of head sliders is formed of ceramics.

3. The device of claim 1, wherein a gap is formed below a core of a magnetic head.

* * * * *